United States Patent [19]

Little, deceased et al.

[11] 4,168,685

[45] Sep. 25, 1979

[54] FUEL METERING DEVICE FOR INTERNAL COMBUSTION ENGINES AND FUEL SYSTEMS INCORPORATING SUCH DEVICE

[76] Inventors: Allan V. Little, deceased, late of Cheltenham, Australia; by Anna Little, administratrix, 2 Shadwell St., Cheltenham, Victoria; Ronald A. Wilkinson, 11 Hutchison Ave., Beaumaris, Victoria 3193, both of Australia

[21] Appl. No.: 666,448

[22] Filed: Mar. 12, 1976

[30] Foreign Application Priority Data

Mar. 14, 1975 [AU] Australia .............................. PC0905

[51] Int. Cl.² ...................... F02M 31/00; F02M 17/18
[52] U.S. Cl. .................... 123/133; 261/44 C; 261/16
[58] Field of Search ................ 123/133, 127, 120, 121; 261/44 R, 16, 145, 144, 50 A, 44 C; 48/180 C

[56] References Cited

U.S. PATENT DOCUMENTS

| | | | |
|---|---|---|---|
| 1,147,608 | 7/1915 | Clark ..................................... | 123/133 |
| 1,688,947 | 10/1928 | Thomas ................................. | 261/16 |
| 2,152,501 | 3/1939 | Robinson ............................. | 123/121 |
| 2,645,906 | 7/1953 | Ryan ..................................... | 123/121 |
| 2,882,882 | 4/1959 | Pantano .............................. | 123/122 F |
| 3,602,202 | 8/1971 | Kobayashi ............................ | 261/16 |
| 3,738,334 | 6/1973 | Farr ..................................... | 123/122 E |
| 3,753,555 | 8/1973 | Lawrence ............................. | 261/44 C |
| 3,832,985 | 9/1974 | Edde ..................................... | 123/122 A |
| 3,930,476 | 1/1976 | Koch ..................................... | 123/122 A |

FOREIGN PATENT DOCUMENTS

| | | | |
|---|---|---|---|
| 785902 | 8/1935 | France ..................................... | 123/133 |
| 937272 | 4/1948 | France ..................................... | 165/52 |
| 945760 | 5/1949 | France ..................................... | 261/16 |

*Primary Examiner*—Ronald H. Lazarus
*Attorney, Agent, or Firm*—Shlesinger, Arkwright, Garvey & Dinsmore

[57] ABSTRACT

A fuel metering device for an internal combustion engine, and in which a metering needle, common to a liquid and gaseous fuel chambers having respective inlets for communication with a respective source of liquid and gaseous fuel for the engine, extends between the outlet of the liquid fuel chamber and one of the inlet and the outlet of the gaseous fuel chamber and has thereat a respective valving member adapted for controlling the volume of fuel metered to the engine induction system; and an engine having such device incorporated in the fuel induction system thereof.

30 Claims, 5 Drawing Figures

FUEL METERING DEVICE FOR INTERNAL COMBUSTION ENGINES AND FUEL SYSTEMS INCORPORATING SUCH DEVICE

This invention relates to fuel metering devices for internal combustion engines and fuel systems therefor.

Increasing concern about the role played by the automobile as a major contribution to serial pollution has lead to intensified research into means of controlling the composition of exhaust gases of the petrol (gasoline) engine. Lack of control over the chemical reactions occurring during combustion is the direct result of an expedient approach on the part of the manufacturer, for it has long been known that he requirements for rapid increases in power output during normal driving are assisted by an increase in the fuel/air ratio.

The fuel/air ratio (mixture strength) is, at any time, primarily dependent upon the design of the fuel metering equipment. Control of the chemical reactions, however, is dependent mainly upon physical and physicochemical factors rather than mathematical ones. Present-day metering devices used on mass-produced automobiles cannot provide the correct conditions for efficient combustion of present-day liquid fuel mixtures.

Liquid fuel carburettors presently in use fall into two main classes: namely, (i) atmospheric pressure spray system—the two-fluid spray—which is further subdivided into static and dynamic types; and (ii) above atmospheric pressure spray system—single fluid spray—known as fuel injection.

By far the most serious disadvantage suffered by all spray carburettors is their inability to cope with the large differences in both density and viscosity which exist between the metered fluids viz. air and fuel. Carburettors are volume proportioning devices. Thus very small volumes of (high density) fuel are required for large volumes of (low density) air, particularly since nitrogen, which accounts for almost 80% of the air inspired, contributes nothing to the exothermic reactions of combustion. For a stoichiometric reaction mixture, only about 2% of total inspired volume is fuel when calculated on a volume basis with the fuel in a vapour state. Thus the metering of small volumes of liquid fuel require small metering orifices which must be carefully designed around the viscosity characteristics of fluid flow.

Static type carburettors using submerged jets require air correction at high gas velocities through the choke tube. Dynamic carburettors using an annular metering orifice, which is also the discharge orifice, exhibit strange discharge characteristics. These require correction in the form of a complex metering needle profile.

Two-fluid spray type carburettors also suffer (a) settling out of fuel spray in the intake manifold. This is often aggravated by impingement upon the throttle plate; and (b) variable vacuum flash-off in the intake manifold as a function of engine load. At small throttle openings, flash-off is maximal and gas velocity minimal. At wide throttle openings, virtually no vacuum flash-off occurs, and vapourization of the fuel can only take place via heat radiation and conduction to both the entrained spray and settled-out fuel. But since velocities in the manifold are high, little time is available for vapourization which must finally be required to be completed in the combustion chamber. This applies particularly to the higher boiling point fractions of the fuel. Fuel injection systems rely for vapourization upon heat radiation to the more finely dispersed fuel droplets.

For the exothermic reaction of carbonaceous fuels with oxygen, they must be in a gaseous or vapour state. However, the rate and mechanistic pathway by which the fuel is burned depends, inter alia, upon whether all of the fuel/air mixture is physically homogeneous or heterogenous of state.

If the mixture is physically homogeneous, burning takes place by a reasonably uncomplicated hydroxylation free radical mechanism to the end products carbon dioxide ($CO_2$) and water ($H_2O$). If liquid and/or solid particles are present and if the speed of flame propagation is high some heat energy is used in thermal cracking of the fuel. During this thermal cracking smaller molecular fragments, including radicals, may (a) react with $O_2$ in a more complex way than that of the hydroxylation mechanism referred to above. Unstable peroxides can form which in turn decompose uncontrollably to produce a variety of organic end products, e.g. ethers, acids and esters;

(b) polymerize to higher molecular weight products—e.g. large hydrocarbon molecules;

(c) react with other radical intermediates again producing various organic end products; and (d) dehydrogenate with formation of elemental carbon.

Wherever thermal cracking of high boiling point fuel occurs in the combustion chamber of spark ignition engines, there is usually insufficient oxygen available in the regions of high hydrocarbon concentration for completion of combustion within the time available.

Clean, complete combustion is therefore not possible at high speeds in engines using spray system carburation.

It follows from the above discussion that almost all of the deficiencies of spray systems are absent in the gas carburettor/manifold system of fuel feed. However, gas engines suffer the obvious practical disadvantages of fuel storage at low pressure or heavy tank and space requirements at high pressure.

The present invention seeks to provide an improved fuel metering device which combines advantages of both systems whilst minimizing disadvantages.

It is also desirable to modify the chemical composition of the petroleum fuel as well as providing the required physical state for combustion. The requirement by regulation for vehicle manufacturers to meet pollution standards through the use of lead-free fuels imposes an octane rating limitation on fuels or an increased refining cost to maintain the rating through the use of increased quantities of reformed hydrocarbons.

These limitations and costs can, however, be avoided by up-grading the lead free fuel by the use of waste exhaust heat. This is achieved by thermal cracking in reactor chambers before metering to the air stream. During the cracking short chain hydrocarbons, including methane ($CH_4$), are produced.

In addition elemental hydrogen is formed and is made to serve three main functions.

(1) It provides an important additional source of hydroxyl radicals for the propagative combustion reactions of carbon fuels to carbon dioxide. In particular carbon monoxide can only oxidize at a significant rate to carbon dioxide via the hydroxyl radical reaction $$CO + .OH \rightarrow CO_2 + H.$$

and $H\cdot + O_2 \rightarrow \cdot OH + O\cdot$ is the oxygen-consuming reaction. The efficiency of this conversion is not primarily dependent upon oxygen supply but upon the ability of the combustion mixture to provide a source of .OH radicals from water or hydrogen, water being formed as an end product of the preceeding hydrocarbon oxidation. The hydroxyl radicals derived from water must arise via an endothermic back reaction $$M^* + H_2O \rightarrow {}^oOH + H^o + M^*$$

or alternatively depend upon the prior production of $O^o$ or $H^o$ radicals $$H^o + H_2O \rightleftharpoons H_2 + {}^oOH \text{ and}$$

$$O^o + H_2O \rightleftharpoons 2{}^oOH$$

The addition of hydrogen to the fuel on the other hand provides a net exothermic production of $^oOH$ radicals to improve the efficiency of carbon dioxide formation.

(2) The wide flammability limits and higher flame speed of hydrogen are important in assisting the ignition and flame propagation of lean mixtures which are defined as those air/fuel ratios in excess of stoichiometric value - and, in accordance with known fact, nitrogen oxide ($NO_x$) formation will decrease with increasing degree of leanness provided a progressive flame front is maintained.

(3) Some elemental hydrogen is capable of being selectively diffused to catalytic exhaust reactors for the purpose of reducing any oxides of nitrogen that are produced during combustion back to elemental nitrogen.

The present invention seeks to provide an improved fuel metering device which combines advantages of both the above classes of systems while minimizing disadvantages of the systems. For this purpose, there is provide a fuel metering device for use with gaseous fuel, such as vaporized or cracked petroleum fuel and/or hot or cooled LPG fuel. The device may be bi-functional to permit metering of gaseous or liquid fuel and in this case is adapted for use in a system permitting change-over or adjustment of the ratio between such fuels, such as by attainment of a predetermined operating condition, for example, temperature.

The present invention also seeks to provide an improved fuel system incorporating such metering devices.

The devices may include a metering member movable to permit variable flow of gas fuel.

According to one aspect of the present invention there is provided a fuel metering device for an internal combustion engine, including means adapted to be mounted adjacent the fuel induction system of the engine and defining a fuel chamber for supplying gaseous fuel to the induction system from an outlet thereof and an inlet adapted for communication with a source of gaseous fuel, and valving means adapted for metering fuel to the induction system, the valving means being located at one of the inlet and outlet of the chamber and being dimensioned for sliding engagement in a bore defining that one of the inlet and outlet.

The bore may have a longitudinal slot extending intermediate its ends for providing communication between the inlet and outlet of the chamber, the valving member being movable from a position adjacent the outer end of the slot in which it prevents flow of fuel to the induction system to an inner position permitting flow of fuel to the induction system at a rate depending on the length of the slot traversed.

The metering member may comprise a metering needle extending through two fuel chambers and movable to permit variable flow of fuel from one or other of two fuel outlets locating respectively in the two fuel chambers.

According to a further aspect there is provided a fuel metering device for an internal combustion engine, including a means adapted to be mounted adjacent the fuel induction system of the engine and defining first and second fuel chambers for supplying liquid and gaseous fuel respectively to the induction system from a respective outlet thereof, and a metering needle common to the fuel chambers, the fuel chambers having inlets adapted for communication with a respective source of liquid and gaseous fuel for the engine, with the needle extending between the outlet of the first fuel chamber and one of the inlet and the outlet of the second fuel chamber and having thereat a respective valving member adapted for controlling the volume of fuel metered to the induction system.

The means defining the fuel chambers may comprise a single housing having a partition therein providing separation between the fuel chambers, the needle extending longitudinally through the partition and being mounted thereby for longitudinal reciprocal movement for simultaneous opening or closing of the respective valving members with respect to the first fuel chamber outlet and the one of the second fuel chamber inlet and outlet.

The needle may extend between the outlet of the first fuel chamber and the inlet of the second fuel chamber, the valving members each being located adjacent a respective end of the needle and being tapered. Moreover, the outlet from the second fuel chamber may be adapted for connection to a conduit for providing communication between that fuel chamber and the engine induction system.

The inlet to the second fuel chamber may be defined by an elongate bore in which the respective valving member is located, the valving member being an annular collar on the needle adjacent the inner end of the bore and dimensioned for sliding engagement with the bore whereby movement of the needle so as to open the valving member with respect to the second fuel chamber inlet must exceed a predetermined lower limit before the second fuel chamber inlet is in communication with the second fuel chamber outlet. Preferably, the inlet to and a portion of the second fuel chamber is defined by an elongate bore through which the needle is axially movable, the bore having a longitudinal slot extending intermediate its ends for providing communication between the inlet and outlet of the second fuel chamber; the valving member being an annular collar on the needle dimensioned for sliding engagement with the bore adjacent the end of the slot nearer the second fuel chamber inlet, when the valving member thereof is closed with respect to that inlet, the collar being movable with the needle along the slot so as progressively to provide increasing communication between the second fuel chamber inlet and outlet through the portion of the slot traversed by the collar.

In the latter case, there may be provided between the slot and the second fuel chamber outlet, an expansion chamber portion of the second fuel chamber for expansion of gaseous fuel to effect adiabatic cooling thereof, prior to passing from the outlet for supply to the fuel induction system of the engine. Additionally, there may be provided in a wall of the means defining the second fuel chamber a duct providing communication between the inlet and outlet ends of the collar, whereby prior to movement of the collar so as to permit communication between the second fuel chamber inlet and outlet through the slot portion traversed by the collar, the device is adapted to provide a small flow of fuel through the second fuel chamber. A fine adjustment means may be provided in the duct for regulation of the fuel flow therethrough for closed throttle conditions of the engine.

In an engine having a fuel induction system including such fuel metering device, the needle may extend beyond the outlet of the first fuel chamber and is adapted for axial movement in dependence on pressure in the engine intake manifold, the outlet of the fuel chamber being located adjacent or defining a jet bridge of the manifold. Thus, for example, the needle may be axially movable by connection to an air valve of the manifold.

Such engine may be adapted for receiving fuel from a source liquid fuel via respective circuits in communication with the inlets of the first and second fuel chambers, the circuit for the second fuel chamber including means for vaporizing and/or thermally cracking fuel to be received by the second chamber. Such vaporizing and/or cracking means may include a housing defining a modification chamber having an inlet and an outlet for passage of fluid hydrocarbon fuel therethrough, the modification chamber having therein means defining a tortuous or labyrinth path for the fuel in flow from the inlet to the outlet, the housing being adapted for external heating whereby fuel received at the inlet as a liquid is vaporized and/or thermally cracked during flow from the outlet to the metering device.

The housing may be adapted to be, or be, mounted in an exhaust system for the engine whereby heating of the housing is effectable by contact with exhaust gases of the engine. Such mounting may result in the inlet and outlet being spaced longitudinally of that duct, the inlet being in communication with the exterior of the duct portion through a conduit extending laterally through a wall defining the duct portion and adapted for connection to the source of fuel for the engine.

The vaporizing and/or cracking means may alternatively or additionally include a housing defining a modification chamber having an inlet and an outlet for passage of fluid hydrocarbon fuel therethrough, the housing being adapted for direct, external flame heating, whereby fuel received at the inlet is vaporized and/or thermally cracked during flow to the outlet. Such flame heatable housing may be mounted in the exhaust manifold of the engine for direct flame heating and, in that form, the housing may define an elongate modification chamber extending within the exhaust manifold at least once across inlet ports thereof, the outlet of the elongate modification chamber being in communication with a conduit extending through a defining wall of the exhaust manifold and connected to the fuel inlet of the second fuel chamber.

The vaporizing and/or cracking means may alternatively or additionally include a further device housing a cracking catalyst, the device having an inlet by which fuel is receivable and an outlet connectable to the inlet of the second fuel chamber. In one form, the further device has an inlet by which fuel is receivable from the flame heatable chamber and an outlet connectable to the inlet of the second fuel chamber.

The further device may include a heavy walled metal enclosure for the catalyst, the walls of the enclosure having a duct therein in communication with the interior of the manifold, there being valve means for controlling flow of exhaust gas from the manifold through the duct and operable on attainment of a predetermined temperature to close the duct against such flow.

So that the invention may be more readily understood an example of one form of the device, and of a fuel system incorporating it, now will be described with reference to the accompanying drawings, in which.

Figure 1:
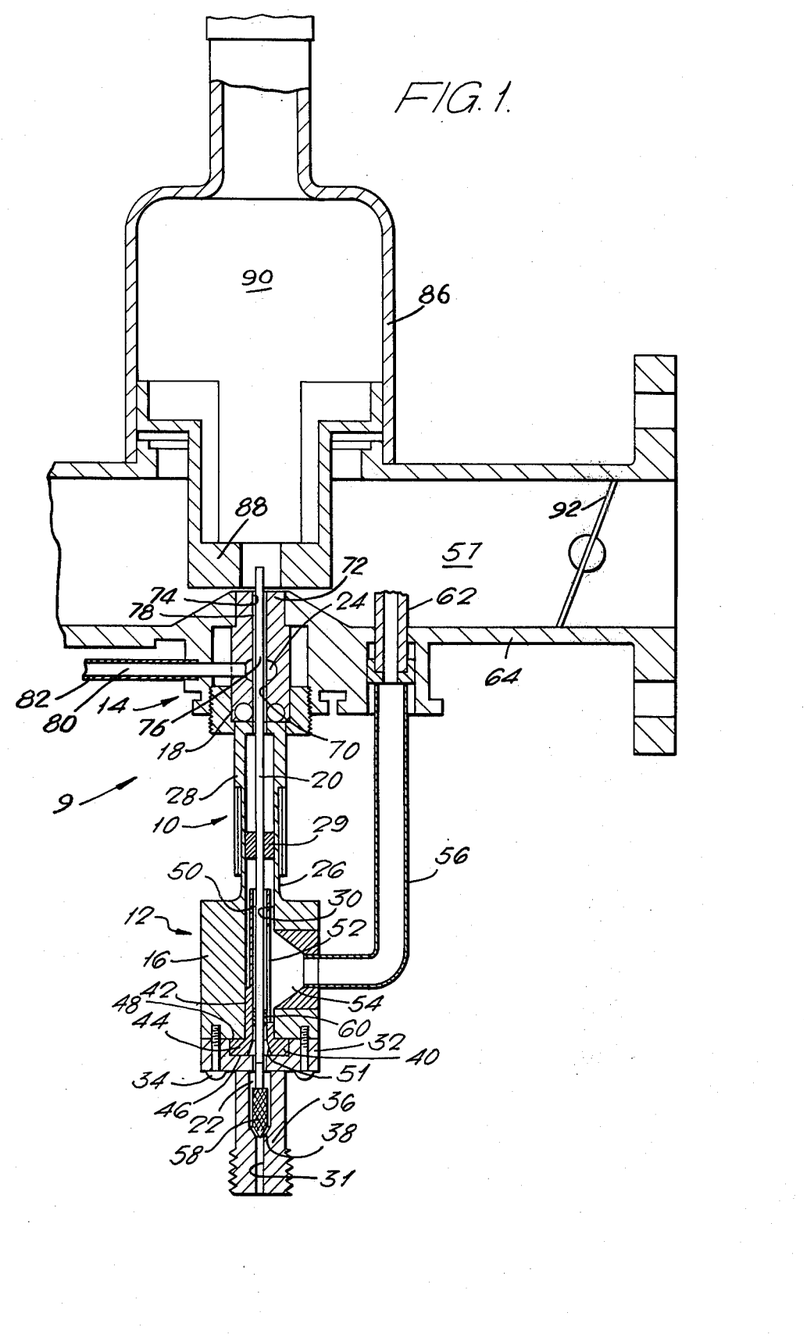
FIG. 1 is a sectional view of a carburettor system, incorporating a device according to the present invention, for an internal combustion engine.
Figure 2:
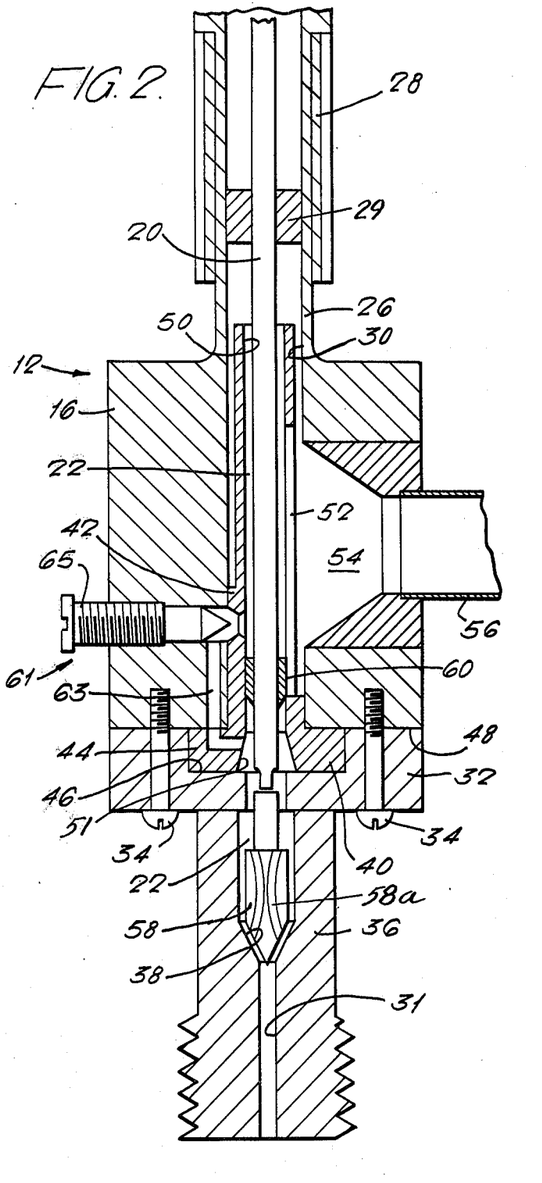
FIG. 2 is a detailed sectional view of a slightly modified form of the gaseous fuel metering portion of the device of FIG. 1.

With reference to FIGS. 1 and 2, the system 9 comprises a SU-carburettor of, for example, the H-type; although other varieties of carburettors can be used in the system and the device of the invention. The fuel metering device 10 for the system is bi-functional and includes a gaseous fuel metering unit 12 and a liquid fuel metering unit 14, here shown as having separate housings 16, 18 respectively. The units have a common metering needle 20 which extends through chambers 22, 24 respectively of the units, and are coupled by means of interfitting tubular extensions 26, 28 of the housings. A separating sleeve 29 within the extensions 26, 28 and through which the metering needle extends, separates the chamber 22, 24.

The housing of the gaseous fuel metering unit 12 has extending therethrough a bore 30 containing chamber 22. This bore terminates at a separable plate 32, fixed to the housing by means of screws 34, and from which projects a tubular extension 36 defining a bore 31 of lesser diameter than and communicating with bore 30. The extension 36 is adapted for connection to a source (not shown) of gaseous fuel and its bore is stepped intermediate the ends thereof to define a tapered seat 38.

Within chamber 22 is provided a gas fuel metering jet 40. The latter is tubular and has a portion 42 of enlarged outer diameter which is tightly fitted in bore 30 adjacent plate 32. Portion 42 terminates at one end of the jet 40 in an annular flange 44 which is secured between recess 46 formed in the inner face of plate 32 and adjacent end wall 48 of housing 12.

The bore 50 of jet 40 is of constant section over the major portion of its length but terminates in an outwardly tapered portion 51 within flange 44. The bore 50 is provided intermediate its ends with a longitudinal slot 52 which defines an outlet for chamber 22 and provides connection between the latter and a collecting chamber 54 for gaseous fuel metered through the slot. Chamber 54, wherein expansion and adiabatic cooling of the gaseous fuel occurs, is formed in the wall of housing 16 and is provided with an outlet by which metered fuel passes, via gas fuel delivery line 56, to a constant depression area 57 of the carburettor between jet bridge 72 and the throttle valve 92 for mixing with air.

The metering needle 20 extends through the bore of jet 40. In one extreme position (the lower position, as illustrated) the metering needle urges shut-off valve member 58 into sealing engagement with seat 38 against the pressure of gaseous fuel supplied to bore 31; the valve member 58 floating below needle 20, except when the engine is stationary when its end of complementary taper to seat 38 is seated thereon.

The metering needle is provided, on its portion within bore 30, with a valving member in the form of an annular plug 60 of complementary section to bore 30 and which preferably is lapped to provide a close fit within the bore 30. With the metering needle in the one extreme position, the plug 60 is located intermediate the slot 52 and the valve member 58. With axial movement of the metering needle to its other extreme position (the upper position), the plug is drawn along the slot 52 to increasingly permit metered flow of gases from chamber 22 to the constant depression area 57, with valve member 58 being lifted off seat 38 by fuel pressure to follow needle 20, and gas flow occurring around member 58 and along grooves 58a thereof.

As shown in FIG. 2, an adjustable by-pass valve 61 which permits throttle overrunning is provided on the housing 16. Valve 61 includes a passage 63 communicating at each end with chamber 22 at points within enlarged portion 42 of metering jet 40 such that, with metering needle 20 almost in its first extreme position (i.e., with member 58 just lifted off seat 38) there is a small flow of fuel to slot 52, bypassing plug 60. An adjustment screw 65, extending through housing 16 into passage 63, permits fine adjustment of the bypass flow.

The gas delivery line 56 terminates at area 57 in a discharge port 62, which extends through the wall of air intake duct 64 defining the constant depression area 57. The discharge port 62 preferably is heat insulated.

The housing of the liquid fuel metering unit 14 has extending therethrough a bore 70 containing chamber 24, which bore terminates at a jet bridge 72 and defines an outlet 74 from chamber 24. A tapered portion 76 of the metering needle extends through the bore 70 to project through outlet 74; the tapered portion and bore 70 defining a variable flow passage 78 between chamber 24 and outlet 74. The taper is such that movement of the metering needle from the first to the second extreme position permits increasing flow of liquid fuel.

An inlet 80 to chamber 24 is provided in the housing, intermediate the ends of the tapered portion 76. A source of liquid fuel (not shown) is connectable to the inlet by means of liquid fuel connector 82.

Within duct 64 is located an air valve 86, here shown in the form of a piston 88 slidable across duct 64 and in a suction chamber 90. The end of the metering needle projecting from outlet 74 is connected to the piston for movement of the metering needle with the piston in response to movement of throttle butterfly valve 92. Thus, on opening of the throttle, the metering needle is raised from the non-operative first extreme position for the carburettor system shown in FIGS. 1 and 2, to permit flow of gaseous fuel to chamber 22 and/or liquid fuel to chamber 24, depending on the selected operation of components controlling the flow of gaseous or liquid fuel to the respective chambers.

Figure 3:
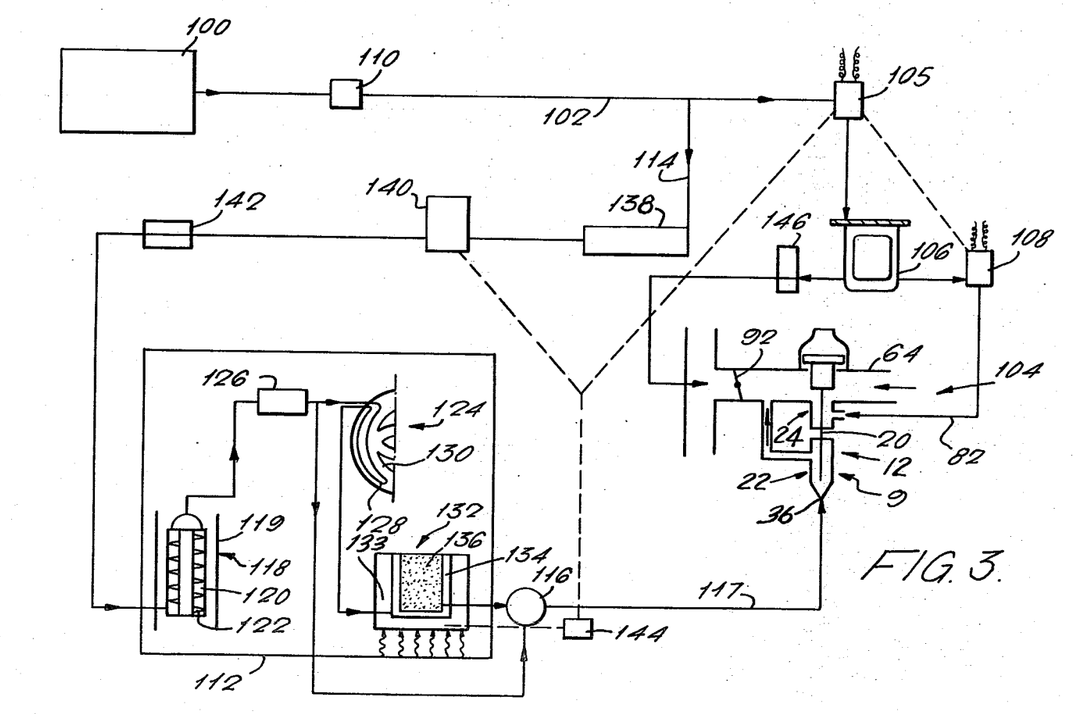
FIG. 3 is a schematic representation of a fuel system incorporating the carburettor system of FIG. 1.

With reference to FIG. 3, there is shown a fuel system including a petrol tank 100 connectable by a liquid-fuel line 102 to a carburettor system 104, via a solenoid actuated valve 105, a float controlled fuel bowl 106 and a solenoid actuated needle valve 108. The line 102 terminates at connector 82 of metering unit 14, for delivering liquid fuel to chamber 24. A low pressure fuel pump 110 in line 102 draws the petrol from the tank.

Line 102 is connected downstream of pump 110 to a petrol vaporizer and/or cracker unit 112 by a branch liquid-fuel line 114; with the outlet of unit 112 being connected via thermostat valve 116 to the extension 36 of metering unit 12 through gaseous fuel ine 17. As shown, the unit 112 is a three stage fuel modifier-catalytic cracker, such as described in our copending patent application, Ser. No. 666,207, filed March 12, 1976, although other vaporizer and/or cracker units may be employed.

The first fuel modifier state 118 of unit 112 consists of a chamber 120 having therein a baffle 122, for example of helical form, defining a tortuous flow path. The primary function of stage 118 is to vaporize petrol, although it can provide a measure of thermal cracking, and for this purpose it is heated by hot exhaust gas such as by being positioned within an exhaust outlet 119. The second stage 124 of unit 112, comprises a heatable duct 128 and receives vaporized fuel, via a pressure regulator 126, from state 118. The vaporized fuel is further heated in duct 128, such as by duct 128 being positioned in the exhaust manifold 130 to receive direct flame heating.

The third stage 132 of unit 112 receives cracked vapor from the second stage. Stage 132 comprises a housing 133 defining a chamber 134 around which exhaust gases are passed, such as through ducting in the walls of housing 133, when the engine is cold but which is short circuited of such gases after heat-up; the chamber 134 containing a cracking catalyst and filter 136 through which the partly cracked vapor from 124 is passed. Chamber 134 also can contain a unit (not shown) comprising a palladium diffuser for selective separation of hydrogen, a restrictor valve from which the hydrogen may be fed, and catalytic reactors, for example, in the exhaust system, for removal of nitrogen oxides from the hydrogen fed thereto via the restrictor valves.

For heating housing 133 with exhaust gases, it has formed in its walls defining chamber 134 a duct which extends around that chamber and communicates, via an inlet and outlet, with the interior of manifold 130 whereby exhaust gases in the manifold can flow around chamber 134. A valve, pivotable on a shaft under the action of thermostat spring, is operable to open and close duct in housing 133 with respect to the interior of the manifold to thereby permit or prevent flow of exhaust gases around chamber 133. The arrangement is such that until a predetermined temperature is attained in chamber 134, and hence in gaseous fuel passing from outlet thereof, the spring is operable to hold the valve open to permit exhaust gases to flow in the duct for rapid heating of housing 133 (heating also being effected by fuel received through the inlet to chamber 134) and thereafter operable to close the valve.

On attainment of a required temperature, further heating of housing 133 due to its mounting on manifold 130 is off-set by convection and radiation losses, such that the housing 133 acts as a heat sink for fuel passing through chamber 134 to the engine. By this means, the fuel can be maintained at a suitable temperature, for example, 200° C., for use in the engine. If operation is such that the suitable temperature is exceeded, fuel flow through chamber 134 can be reduced, with flow of fuel to the engine being supplemented by fuel received direct from the first stage 118 to valve 116 (FIG. 3) to by-pass stage 132.

Petrol is drawn into line 114 by means of a high pressure pump 138 and passes to unit 112 via a solenoid valve 140 and flow controller 142 sensitive to engine load.

The third stage 134 has associated, therewith a thermoswitch 144 which is electrically connected, as shown in FIG. 3 by broken lines, to solenoid needle valve 108, via solenoid valve 105, and to solenoid valve 140. During engine operation on liquid fuel, such as before attainment of a predetermined engine temperature as detected by switch 144, the switch 144 actuates solenoid valves 105 and 108 to open to permit flow of liquid petrol to float valve 106 and from the latter to liquid fuel chamber 24 of the carburettor system through open needle valve 108; petrol then passing direct to air duct 64 of the carburettor system via electrically or mechanically operable auxiliary start-up valve 146. For operation on cracked petrol vapor, on attainment of the predetermined engine temperature, switch 144 actuates solenoid valves 105 and 108 to close to terminate flow to chamber 24, and actuates valve 140 to open to pass petrol to unit 112 for generation of cracked petrol vapor to be psassed to gaseous fuel chamber 22 of the carburettor system. Solenoid valves 105, 108 and 140 thus, positively isolate the parts of the system used for liquid fuel or gaseous fuel operation and which are not required at any particular time; i.e., during warm-up or, in the event of malfunction, to isolate the defective part.

Figure 5:
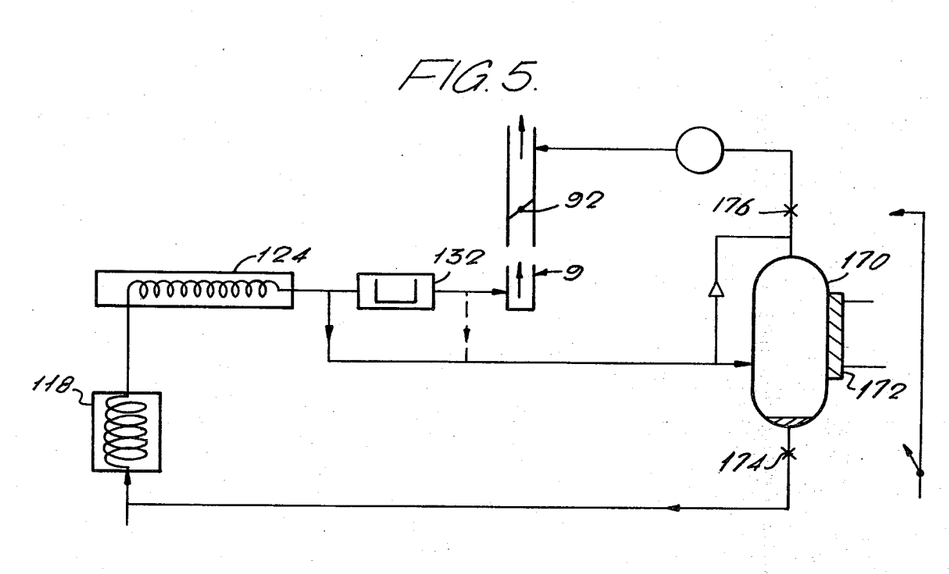
FIG. 5 is a schematic representation of a modified form of the system of FIG. 3.

In an alternative form, switch 144 may be of a type operable, in dependence on the pressure of gaseous fuel available for supply to fuel chamber 22, to control valves 105, 108 and 140; the latter being electrically, electromechanically, pneumatically or hydraulically operable. Thus, if available gaseous fuel pressure (in, for example, an accumulator 170 as in FIG. 5) is below a predetermined level, switch 144 will close valve 140 and open valves 105 and 108 for engine operation on liquid fuel via chamber 24 and, when gaseous fuel pressure exceeds the predetermined level, it will close switches 105 and 108 and open switch 140 for engine operation on gaseous fuel via chamber 22.

Operation of the system now will be described with reference to FIGS. 3 and 4.

The carburettor system 9 may be mounted on a normal engine inlet manifold, or, preferably, on a manifold designed for gas flow alone rather than one designed to cope with separated fuel spray. The manifold preferably should be completely separate from the exhaust system and the engine water cooling system i.e. no heated risers or main tracts, and kept as cool as possible.

The carburettor system utilizes the float controlled fuel below 106 for starting and warm-up, during which the solenoid needle valve 108, which may be mounted on the bowl, provides control of petrol feed to the jet bridge and controlled change-over to gaseous fuel.

The high pressure fuel pump 138 should be fitted with a non-return valve, and preferably a pressure gauge, in the outlet from the pump to prevent gaseous fuel venting through the pump should the fuel pump cease to operate while the ignition switch and high pressure fuel solenoid are activated.

The load sensing fuel flow controller 142 may be mounted in any convenient position but preferably removed from exhaust heat. A diaphragm chamber of the controller preferably is connected directly to the inlet manifold to permit monitering of the engine load as indicated by pressure in that manifold for control of flow from pump 138 to unit 112 and gaseous fuel chamber 22.

Figure 4:
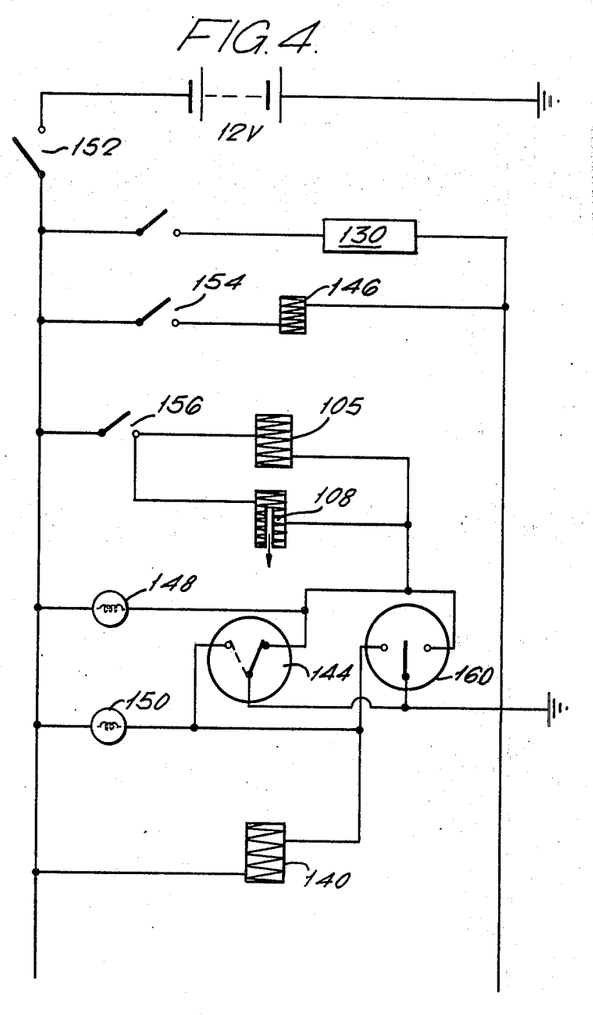
FIG. 4 is a circuit diagram for an ignition system for the fuel system of FIG. 3.

Suitable electrical connections are shown in the wiring diagram of FIG. 4. As indicated in FIG. 4, warning lamps 148, 150 indicate which fuel system, respectively, is operating, or will operate, when switch 152 of the ignition circuit is closed.

For start-up and drive away in cold conditions, the ignition circuit switch 152 is closed; the "choke" switch 154 is closed or the mechanical starting carburettor valve is operated; and the "manual off" switch 156 is closed; after which the "spray fuel" lamp 148 will indicate. With manual override switch 160 in the "off" position, a switch 161 of the high pressure fuel pump is actuated. The engine then is cranked with the starter motor and, after the engine fires, the choke switch 154 is opened. The engine now runs normally on the spray function of the carburettor being fed liquid fuel from the low pressure fuel pump via the spray fuel solenoid and needle valves; these being activated by the position of the thermoswitch 144 inserted e.g., in the exhaust manifold.

The vehicle can now be driven away. From the instant of starting, the three stages of the fuel modification unit 112 heat rapidly, particularly with the engine under load. During this heat up period, condensed fuel in unit 112 from previous operation is vaporized and expelled from the gas port in the carburettor since, as long as the engine is operating, the cracked gaseous fuel shutoff valve member 58 is free to lift off its seat 38. At a predetermined temperature, governed e.g., by catalyst chamber requirement and fuel boiling range, the thermoswitch 144 shuts off the spray fuel supply, simultaneously feeding fuel to the first stage modifier 118 for vaporization. Pressure rises rapidly throughout the whole system, whereupon cracked gaseous fuel commences to flow to chamber 22 at exactly the required rate predisposed by the position of the air valve 86 which monitors the engine speed and load at all times and hence, the degree to which valve member 60 is moved along slot 52 with needle 20. It is therefore of no importance whether the switch-over point is reached at no load (idling), light load, or heavy load conditions; temperature being the parameter determining switch-over. A smooth change-over without loss of power, or misfiring is affected.

To prevent condensation and resultant uncontrolled richening of the mixture a heater (for example 100-150 watts) such as a resistance heater in the form of a mineral-insulated, copper-sheathed cable (e.g. Pyrotenax) may be wound around the fuel gas metering chamber and activated by the thermoswitch during the heat up period in which fuel is fed to the spray assembly section of the carburettor. On change-over to fuel gas feed, such heater is inactivated.

For as long as the major components retain considerable heat, pressure will be retained within the gas injection system. The metering needle 20 common to chambers 22 and 24, will cause the shut-off valve member 58 to rest on its seat 38 at the inlet to chamber 22 and all electrically operated valves will be closed with the ignition off. On hot restart, cranking the engine causes the air valve 86 to lift thus freeing the gas shut-off valve member 58. Cracked gaseous fuel pressure within the system lifts the needle from its seating, and the gaseous fuel is discharged into the inspired air in duct 64 and the engine fires immediately.

For warm restart after pressure drop within the gaseous fuel system, the thermoswitch may have returned the system to spray operation. In this case subsequent events will be the same as cold start except that there will be no need for "choke" operation i.e. the engine should fire on the spray system.

If, however, the thermoswitch has not reset for operation of the spray system, fuel spray operation can be achieved for a short period by use of the manual override switch 160 shown in the wiring diagram. As soon as full gaseous fuel pressure is achieved the switch can be returned to the "off" position.

No special procedures are required for shut-down. The engine may be stopped without lowering the fuel pressure. Condensation in unit 112 occurring during cooling can assist in getting the vehicle away after a cold restart since this fuel vaporizes during warm-up and enriches the spray mixture. It therefore allows the use of a "lean profile" taper on the spray metering tapered section 76, at bridge 72, of the metering needle 20.

In one form of the system of FIG. 3, the low pressure fuel pump 110 delivers petrol at 2 PSIG or higher and may comprise a standard electrical or mechanical fuel pump of the conventional carburettor fitted engine. High pressure fuel pump 138 also may be electrical or mechanical, and preferably has a non-return valve in its outlet and delivers petrol at 30 PSIG or higher. The flow controller 142 preferably is a vacuum system diaphragm valve which allows full fuel flow except at times of closed-throttle operation, i.e., idling or closed throttle overrun, with fuel flow in the latter case being restricted by adjustable bypass valve 143.

The fuel system is capable of supplying an engine with a substantially constant fuel/air ratio over the whole range of speed and load requirements by functioning primarily as a gas/gas metering system in place of the usual gas/liquid system.

Operation of the system can be achieved without pressure regulator 126 but not without hunting at wide throttle openings due to the rapid change in volume of fuel entering the vaporizer. Pressure fluctuations are damped out by running the high pressure fuel injector pump 138 at a pressure above that at which the metering section is designed to operate, then reducing it to a desired pressure of approximately 15 PSIG.

Bimetal thermostatic valve 116 comprise a small chamber containing a bimetal spiral actuating a rotary valve. This is interposed between the third stage 132 modifier and the carburettor system. Above about 200° C., for example the valve admits fuel gas directly from the first stage 118 to prevent the occurrence of lean mixtures and adverse effects on volumetric efficiency, bypassing the second and third stages 124, 132.

The general system such as shown in FIG. 3 may be used for the vaporization and thermal cracking of poorer quality fuels of much higher flash point and initial boiling point. Such a use is of advantage where regulations prohibit the use of petrol (gasoline) engines and restrict power plants to those of the diesel type.

Where these fuels may be used in spark-ignition engines (after modification according to the described method of this invention), the attainment of a suitably vaporized fuel/air mixture for restarting could present difficulties.

Electric heaters within, for example, the starting carburettor section could provide a solution but by the embodiment of an additional chamber, connected in parallel between the second and third stage cracking chambers or between the third stage and the metering unit, the system can provide for restart conditions following normal temperature operation. A modified system having such chamber now will be described with reference to FIG. 5, wherein like parts have the same reference numerals as in FIG. 3.

The function of the chamber, and the means by which it may be incorporated in the system of FIG. 3, is as follows:

Hot gaseous fuel is led into the accummulation chamber 170 at normal operating pressure. The chamber may be provided with either water or air cooling means 172, whereupon condensable compounds settle out and are allowed to return, via suitable valves 174, to the first stage evaporator. During operation of the engine, non-condensable gases will accummulate within the chamber, until a point is reached where no further cracked fuel will enter the chamber, i.e. when the pressure of the non-condensable gases equilibrates to the pressure of operation.

At engine shut-down, isolation valves 174, 176 attached to the accummulator, may be closed, e.g. electromagnetically, thereby leaving the system charged with gaseous fuel for restarting.

The cold restarting procedure then requires a modification of that suggested for volatile fuels and in particular could provide for short-period supply (after initial restart on accummulator gas) of vaporized fuel directly from stage 2 to a metering orifice on the engine side of the carburettor butterfly valve.

Control of the valves required for this operation can be governed by the thermoswitch in an exactly similar manner to that described for initial fuel spray operation using volatile fuels (FIG. 3).

It will be appreciated that apart from the very short chain hydrocarbons like methane and ethane, thermal cracking produces a variety of hydrocarbons. The energy available from the combustion of the cracked products is higher than that from the combustion of the original uncracked fuel of equivalent total carbon and hydrogen composition. This is directly reflected in the chemical bond energies of the otherwise equivalent fuels and is the direct result of restoring, endothermically, some of the waste exhaust heat into the incoming fuel.

Further use can be made of the large amount of waste heat available to produce even further quantities of hydrogen through the reaction of water with hydrocarbons under heat-controlled catalytic conditions, according to the equation:

$$C_nH_{2n+2}+{}_nH_2O \rightarrow nCO+2n+1H_2+\Delta H^o$$

The technique suffers, however, from the need as can be seen from the equation, for a high mole ratio of water to hydrocarbon; so that for fuels of even medium carbon number, n, the catalyst must be extremely efficient.

Furthermore in accordance with the laws of mass action, a water/hydrocarbon ratio well is excess of the stoichiometric value is often required to drive the reaction sufficiently from left to right. Separation of excess water after reaction puts the scheme at a disadvantage for practical automobile operational purposes. Also there is usually a requirement for regeneration with suitable types of catalyst which can become choked with carbon. Given these problems, complete flame quenching generally has been found to occur quite rapidly under practical operation conditions.

Proportioning water to fuel using metering pumps is expensive and again suffers that disadvantage, described above for liquid fuel systems, of the requirement to maintain high accuracy with liquids delivered in small volumes.

Notwithstanding these remarks, some water, additional to that which is inspired as a variable constituent of normal engine air, is desirable in hydrocarbon fuels. It is considered simpler, and much cheaper for comparable accuracy, to incorporate it in the fuel itself such as by solubilization via suitable additives, e.g. alcohols.

Such mixtures can be fed with advantage directly into the thermal cracking devices described herein. Less carbon is formed during thermal cracking, indicating the operation, to some degree, of the reaction shown above and/or the alternative water gas reaction $$C + H_2O \rightarrow Co + H_2 + \Delta H^*$$

The fuel system, as described and without substantial modification, can be used as a metering carburettor for LPG. The usual pressure control equipment (diaphragm regulator and anti-freeze heat exchanger) can be used and the LPG then fed directly to the gas shut-off valve 58. Alternatively, the gas can be fed directly into the inlet of the cracking system of unit 112.

Furthermore the system is capable of use as a compound petrol and or LPG system where there is a choice of four operating modes
(1) liquid fuel spray
(2) hot cracked (modified) fuel
(3) hot LPG or
(4) cold (direct) LPG.

Finally, it is to be understood that various alterations, modifications and/or additions may be introduced into the constructions and arrangements of parts previously described without departing from the spirit or ambit of the invention.

The claims defining the invention are claimed as follows:

1. A fuel metering device for an internal combustion engine having a fuel induction system including an air supply duct in which a partial vacuum is regulated in use by a throttle valve, the fuel metering device comprising:
    a first chamber having an outlet bore connecting said first chamber to the air duct at a first point upstream of the throttle valve with respect to air flow through the air duct and an inlet connectable to a liquid fuel supply system for the engine;
    a second chamber having an outlet connected to the air duct at a second point upstream of the throttle valve with respect to air flow through the air duct and an inlet connectable to a gaseous fuel supply system for the engine, a portion of said second chamber adjacent said second chamber outlet being elongated and generally cylindrical in form with said second chamber outlet comprising an elongated slot extending longitudinally in said elongated cylindrical portion;
    an elongated longitudinally movable metering needle extending from within said first chamber outlet bore into said elongated cylindrical portion of said second chamber, said needle being axially disposed within said first chamber outlet bore and having a first valve means thereon within said first chamber outlet bore for controlling through longitudinal movement of said needle the flow of liquid fuel to the induction system through said first chamber outlet, said first valve means comprising a tapered portion of said needle whereby longitudinal movement of said needle varies the passage between said bore and said tapered portion of said needle;
    said needle having a second valve means thereon within said portion of said second chamber adjacent said second chamber outlet for controlling through longitudinal movement of said needle the flow of gaseous fuel to the induction system through said second chamber outlet, said second valve means comprising a portion of said needle which in cross section closely fits said portion of said second chamber adjacent said second chamber outlet and is so positioned that with longitudinal movement of said needle said second valve means moves along said elongated slot to provide varying amounts of communication between said slot and said second chamber; and,
    needle movement means causing said needle to move longitudinally in dependence on the partial vacuum in the air duct whereby longitudinal movement of said needle results in simultaneous controlling of said first and second chamber outlets.

2. The device of claim 1 wherein said second valve means is an annular collar on said needle.

3. The device of claim 1 wherein said first and second chambers are within a single housing having a partition therein separating said first chamber from said second chamber and said needle extends longitudinally through said partition.

4. The device of claim 2 wherein said second chamber is an elongated bore through which said needle is axially movable.

5. The device of claim 1 and including an expansion chamber into which said second chamber outlet feeds, said expansion chamber permitting the expansion of gaseous fuel to effect adiabatic cooling thereof prior to its entering the fuel induction system.

6. The device of claim 1 and including a duct having an inlet connected to said second chamber and an outlet connected to said second chamber outlet so as to bypass said second valve means to permit flow of fuel past said second valve means when said second valve means is in the closed position.

7. The device of claim 6 and including fine adjusting means in said duct for regulating the fuel flow therethrough.

8. A fuel delivery device for an internal combustion engine having a fuel induction system including an air supply duct in which a partial vacuum is regulated in use by a throttle valve and a jet bridge located in the air duct upstream of the throttle valve with respect to air flow through the duct, the fuel delivery device comprising:
    a liquid fuel supply system;
    a gaseous fuel supply system including means for vaporizing and cracking liquid fuel from said liquid fuel supply system;
    a first chamber having an outlet bore connecting said first chamber to the air duct at the jet bridge and an inlet connected to said liquid fuel supply system;
    a second chamber having an outlet connected to the air duct at a point upstream of the throttle valve with respect to air flow through the air duct and an inlet connected to said gaseous fuel supply system, a portion of said second chamber adjacent said second chamber outlet being elongated and generally cylindrical in form with said second chamber outlet comprising an elongated slot extending longitudinally in said elongated cylindrical portion;

an elongated longitudinally movable metering needle extending from within said first chamber outlet bore into said elongated cylindrical portion of said second chamber, said needle being axially disposed within said first chamber outlet bore and having a first valve means thereon within said first chamber outlet bore for controlling through longitudinal movement of said needle the flow of liquid fuel to the induction system at the jet bridge through said first chamber outlet, said first valve means comprising a tapered portion of said needle whereby longitudinal movement of said needle varies the passage between said bore and said tapered portion of said needle;

said needle having a second valve means thereon within said portion of said second chamber adjacent said second chamber outlet for controlling through longitudinal movement of said needle the flow of gaseous fuel to the induction system through said second chamber outlet, said second valve means comprising a portion of said needle which in cross section closely fits said portion of said second chamber adjacent said second chamber outlet and is so positioned that with longitudinal movement of said needle said second valve means moves along said elongated slot to provide varying amounts of communication between said slot and said second chamber; and, needle movement means causing said needle to move longitudinally in dependence on the partial vacuum in the air duct whereby longitudinal movement of said needle results in simultaneous controlling of said first and second chamber outlets.

9. A device according to claim 8 wherein said vaporizing and cracking means includes a modification chamber having an inlet and an outlet for passage of fluid hydrocarbon fuel therethrough; said modification chamber having therein means providing a tortuous labyrinth path for fuel flow from said modification chamber inlet to said modification chamber outlet; and means for externally heating said modification chamber whereby fuel received at said modification chamber inlet as a liquid is vaporized and cracked during flow from said modification chamber inlet to said modification chamber outlet.

10. A device according to claim 9 wherein said modification chamber is mounted in the exhaust system whereby heating of said modification chamber is effected by contact with exhaust gases of the engine.

11. A device according to claim 10 wherein said modification chamber is mounted within a portion of the exhaust duct with said modification chamber inlet and said modification chamber outlet spaced longitudinally within the duct and said modification chamber has an inlet conduit extending laterally through the duct to the duct exterior, said inlet conduit being connected to said liquid fuel supply system.

12. A device according to claim 11 wherein said modification chamber has an outlet conduit to which said modification chamber outlet is connected, said outlet conduit extending longitudinally of the duct and being connected to said second chamber inlet and said modification chamber inlet and said modification chamber outlet being spaced so that the fuel flow from inlet to outlet is counterdirectional to the exhaust gas flow through the exhaust duct.

13. A device according to claim 9 wherein said modification chamber has an outer encircling wall and an inner wall forming a bore extending through said modification chamber, said inner and outer walls forming said modification chamber therebetween whereby hot exhaust gases may flow through and around said modification chamber.

14. A device according to claim 13 wherein said modification chamber is of annular form, said means therein providing a tortuous labyrinth path being a helical baffle with said modification chamber inlet and said modification chamber outlet each being adjacent a respective end of said baffle.

15. A device according to claim 8 wherein said vaporizing and cracking means includes a modification chamber having an inlet and an outlet for passage of fluid hydrocarbon fuel therethrough, said modification chamber having means for direct external flame heating whereby fuel received at said modification chamber inlet is vaporized and cracked during flow to said modification chamber outlet.

16. A device according to claim 9 wherein said vaporizing and cracking means also includes a second modification chamber having an inlet and an outlet for passage of fluid hydrocarbon fuel therethrough, said second modification chamber having means for direct external flame heating whereby fuel received at said second modification chamber inlet is vaporized and thermally cracked during flow to said second modification chamber outlet.

17. A device according to claim 15 wherein said modification chamber is mounted in the exhaust manifold of the internal combustion engine for direct flame heating therein.

18. A device according to claim 15 wherein said modification chamber is mounted in the exhaust manifold of the internal combustion engine for direct heating therein, said modification chamber being elongated in form and extending within the exhaust manifold at least once across the inlet ports thereof and said modification chamber has an outlet conduit to which said modification chamber outlet is connected, said outlet conduit extending through the exhaust manifold wall and being connected to said second chamber inlet.

19. A device according to claim 8 wherein said vaporizing and cracking means includes a modification chamber housing a cracking catalyst for hydrocarbon fuel, said modification chamber having an inlet by which fuel is received and an outlet connected to said second chamber inlet.

20. A device according to claim 15 wherein said vaporizing and cracking means also includes a second modification chamber having an inlet and an outlet for passage of fluid hydrocarbon fuel therethrough, said second modification chamber housing a cracking catalyst for hydrocarbon fuel.

21. A device according to claim 19 wherein said modification chamber includes a heavy walled metal enclosure for the catalyst, the walls of the enclosure having a duct therein connected to the interior of the manifold, there being valve means for controlling the flow of exhaust gas from the manifold through the duct and operable on attainment of a predetermined temperature to close the duct against such flow.

22. A device according to claim 8 wherein said liquid fuel supply system has associated therewith a means responsive to engine operating temperature for closing said liquid fuel supply system at a predetermined engine temperature and bringing said gaseous fuel supply system into communication with the fuel induction system.

23. A device according to claim 8 wherein said liquid fuel supply system has associated therewith means responsive to the pressure of gaseous fuel available for supply to said second chamber inlet for closing said liquid fuel supply system at a predetermined available gaseous fuel pressure and bringing said gaseous fuel supply system into communication with the fuel induction system.

24. A device according to claim 22 wherein said liquid fuel supply system and said gaseous fuel supply system each has a control valve, said means responsive to engine operating temperature being a thermo-switch adapted to close and open said liquid fuel supply system valve and open and close said gaseous fuel supply system valve in dependence on whether the engine is above or below the predetermined temperature.

25. A device according to claim 24 wherein said liquid fuel supply system includes a second control valve and a float controlled fuel bowl for receiving fuel from the fuel tank via said first liquid fuel supply system control valve and for supplying fuel to the jet bridge of the fuel induction system via said second control valve, said second control valve being openable and closable with opening and closing of said first liquid fuel supply system control valve.

26. A device according to claim 25 wherein said liquid fuel supply system has a line providing communication between said fuel bowl and the fuel induction system, said line having a valve therein operable for engine start-up to supply reserve fuel from said fuel bowl to the fuel induction system.

27. A device according to claim 8 and including an accumulation chamber having an inlet for receiving from said means for vaporizing and cracking liquid fuel gaseous fuel that is non-condensable at ambient temperature and an outlet in communication with the fuel induction system.

28. A device according to claim 27 wherein said accumulation chamber has a further outlet for recycling any condensed fuel accumulating therein, said further outlet being in communication with a conduit connected to said means for vaporizing and cracking fuel.

29. A device according to claim 27 wherein said accumulation chamber is provided with cooling means for cooling fuel supplied thereto and thereby separating condensable and non-condensable fractions of the fuel.

30. A device according to claim 1 wherein the air supply duct of the fuel induction system includes a jet bridge upstream of the throttle valve with respect to air flow through the duct, said first chamber outlet bore being connected to the air duct at the jet bridge, and said second chamber outlet being connected to the air duct at a point in between the jet bridge and the throttle valve whereby said first chamber outlet bore and said second chamber outlet are connected to a constant depression area in the air supply duct.

* * * * *